United States Patent
Fleischhacker et al.

(10) Patent No.: US 10,439,659 B1
(45) Date of Patent: Oct. 8, 2019

(54) DEVICE TO MINIMIZE CURRENT OVERSHOOT IN DETUNED ANTENNA

(71) Applicant: NXP B.V., Eindhoven (NL)

(72) Inventors: Jens Fleischhacker, Hamburg (DE); Hermanus Johannes Effing, Overasselt (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/277,377

(22) Filed: Feb. 15, 2019

(51) Int. Cl.
| | |
|---|---|
| *H04B 17/00* | (2015.01) |
| *H04B 17/12* | (2015.01) |
| *H04B 1/40* | (2015.01) |
| *H04B 1/04* | (2006.01) |
| *H04B 1/74* | (2006.01) |

(52) U.S. Cl.
CPC ............ *H04B 1/04* (2013.01); *H04B 1/745* (2013.01)

(58) Field of Classification Search
CPC .......... H04B 1/04; H04B 2001/0416; H04B 1/0458; H04B 1/40; H04B 1/17; H04B 17/104; H04B 17/12
See application file for complete search history.

(56) References Cited

U.S. PATENT DOCUMENTS

| | | | | |
|---|---|---|---|---|
| 6,906,612 | B2 * | 6/2005 | Ghabra | B60R 25/24 340/5.61 |
| 9,894,613 | B2 * | 2/2018 | Scheim | H04W 52/0245 |
| 2015/0004917 | A1 * | 1/2015 | Juzswik | H04B 17/318 455/67.13 |
| 2018/0304702 | A1 * | 10/2018 | Urano | B60R 11/02 |

OTHER PUBLICATIONS

Atmel Corporation, ATA5291 PEPS Driver and Immobilizer Base Station, Summary Datasheet, 6 pgs. (2015).

* cited by examiner

*Primary Examiner* — Blane J Jackson
(74) *Attorney, Agent, or Firm* — Rajeev Madnawat

(57) ABSTRACT

A low frequency (LF) antenna control circuit is disclosed. The LF antenna control circuit includes an antenna driver to drive an antenna, a current and phase measurement circuit to measure antenna current and signal phase, a modulator to modulate a signal to be transmitted via the antenna and a controller configured to drive the antenna through the antenna driver using a first fixed amplitude for a first time period, a second fixed amplitude for a second time period that is subsequent to the first time period and subsequent to the second time period, and subsequently, to drive the antenna using step up/down voltages based on the measured antenna current and signal phase. The signal included encoded bits of data to be transmitted.

16 Claims, 2 Drawing Sheets

DEVICE TO MINIMIZE CURRENT OVERSHOOT IN DETUNED ANTENNA

BACKGROUND

Inductance-Capacitance (L-C) antennas are used to radiate the low frequency magnetic field in Passive Keyless Entry system to establish communication between a vehicle antenna and a second antenna in a vehicle key. Ideally these antennas are tuned to the carrier frequency, however in practical situations, the resonance frequency deviates from the carrier frequency due to component spread (deviations from the rated value) and/or environmental reasons. These deviations may cause detuning in antennas and the detuning may cause error in data transmission.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a low frequency (LF) antenna control circuit is disclosed. The LF antenna control circuit includes an antenna driver to drive an antenna, a current and phase measurement circuit to measure antenna current and signal phase, a modulator to modulate a signal to be transmitted via the antenna and a controller configured to drive the antenna through the antenna driver using a first fixed amplitude for a first time period, a second fixed amplitude for a second time period that is subsequent to the first time period and subsequent to the second time period, to drive the antenna using step up/down voltages based on a current and phase measurement feedback. The signal included encoded bits of data to be transmitted. In some examples, the controller is configured to apply the current overshoot/undershoot control as described herein for every rise and fall of the signal that represents bits of the data being transmitted.

In some examples, the LF antenna control circuit is incorporated in an integrated circuit and the integrated circuit includes one or more pins to couple the antenna to the integrated circuit. The LF antenna control circuit may include a plurality of drivers to drive a plurality of antennas.

The modulator is configured to encode the signal using amplitude modulation with one of the data encoding techniques such as Manchester encoding and binary pulse length modulation (BPLM). Other comparable encoding mechanism, as well known to a person in the art, may be used for encoding the transmitted data.

A calibration process is used to determine the first fixed amplitude, the first time period, the second fixed amplitude and the second time period for the LF antenna control circuit. The current and phase measurement circuit is configured to measure the antenna current and signal phase continuously during the transmission of the signal. The changes in the antenna characteristics may also occur due to changes in component characteristics such as aging capacitors or inductors, or changes in ambient temperature or distance to a metallic object, etc.

The calibration process includes storing the first fixed amplitude, the first time period, the second fixed amplitude and the second time period in a memory readable by the controller. In some examples, the first voltage is less than the second voltage. However, at least in some scenarios, the calibration process may also result in the second voltage being less than the first voltage. The first time period is shorter than the second time period. However, similar to the voltages, at least in some scenarios, the calibration process may result in the second time period being shorter than the first time period.

In some examples, the first fixed amplitude, the first time period, the second fixed amplitude and the second time period may be determined by the controller based on antenna properties, for example, the Q factor and the impedance of the antenna and the measured phase and current. In some embodiments, the controller is further configured to drive the antenna through the antenna driver using a third fixed amplitude for a third time period prior to driving the antenna using step up/down voltages based on the current and phase measurement feedback.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Note that figures are not drawn to scale. Intermediate steps between figure transitions have been omitted so as not to obfuscate the disclosure. Those intermediate steps are known to a person skilled in the art.

DETAILED DESCRIPTION

Many well-known manufacturing steps, components, and connectors have been omitted or not described in details in the description so as not to obfuscate the present disclosure.

L-C antennas are used to radiate the low frequency magnetic field in Passive Keyless Entry system to establish communication between a car antenna and a second antenna in a car key. Please note that the term "car" is being used generally. A person skilled in the art would appreciate that the embodiments described herein may be applied to any remote keyless locking and controlling systems.

Ideally these antennas are tuned to a carrier frequency, however in practical scenarios, the resonance frequency of an antenna may deviate from the carrier frequency due to environmental reasons or aging of the components such as inductors, capacitors, etc. In some examples, the communication of the car antenna and the key fob antenna is done by the amplitude modulation ON/OFF keying (OOK) method. The data send by OOK could be coded as Manchester bits, half bits, binary pulse length modulation (BPLM) or other comparable coding methods. The shaping of the OOK (for example, rise and fall time, current overshoots, etc.) on the car antenna is important for the key fob antenna because, for example, slow rise and fall times and/or current over/undershoots may prevent proper demodulation on the receiver side. Embodiments described herein addresses a controlled rise in current so that current overshoot or undershoot occurs beyond permissible limits every time a coded bit is transmitted. The embodiments described here may be practiced both in the vehicle side transmitter and/or the key side transmitter.

Typically, when an antenna is detuned, efforts are made to attempt to tune the antenna, for example, by adjusting antenna resonance frequency by adjusting antenna inductance and/or capacitance. However, the embodiments described herein adjust the signal amplitude accordingly to a calibration curve or according to the properties of the antenna and measured antenna phase and current at the start of the transmission of a bit and then accordingly to a continuous monitoring of the amount of detuning of the antenna characterized by the current and phase measurements.

Figure 1:
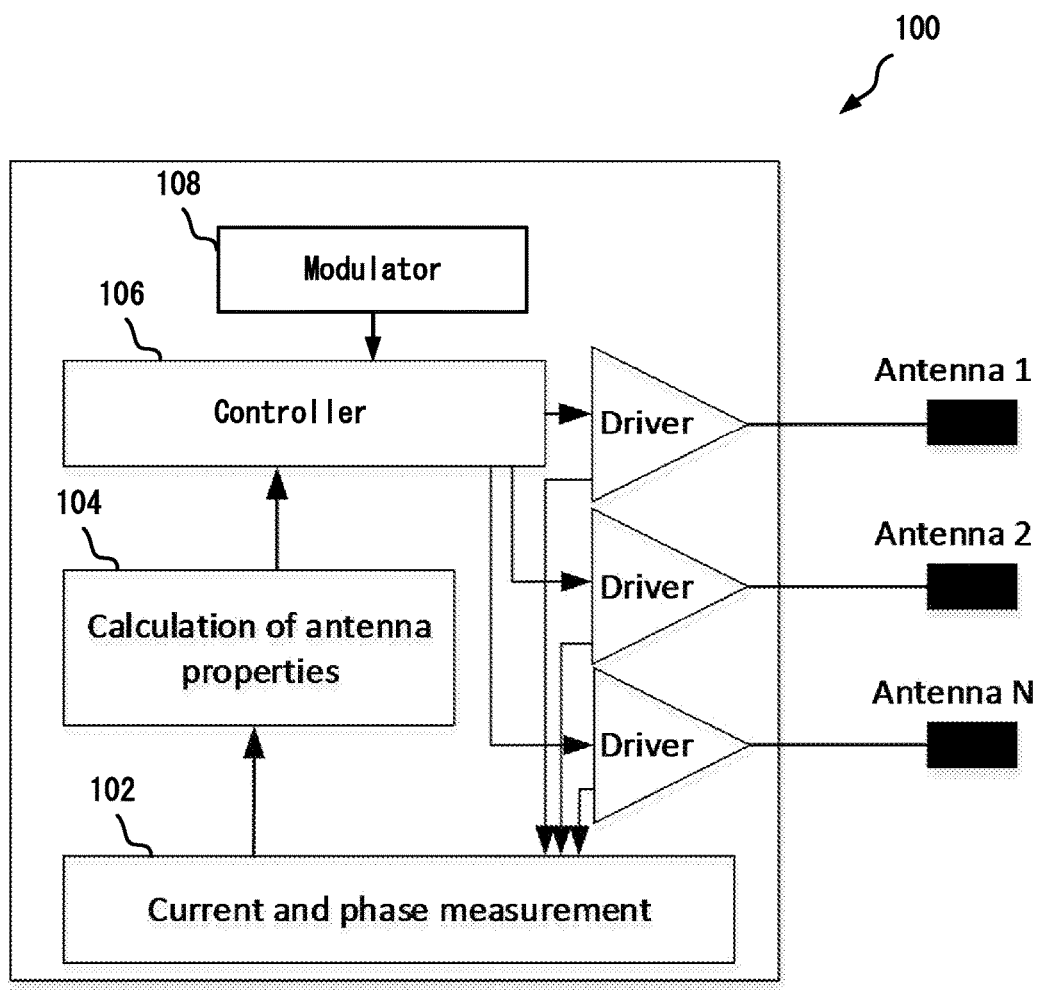
FIG. 1 depicts a low frequency (LF) antenna control circuit in accordance with one or more embodiments of the present disclosure.

FIG. 1 illustrates a LF antenna control circuit 100. In some examples, the LF antenna control circuit 100 may be fabricated in one integrated circuit. The LF antenna control circuit 100 includes a current and phase measurement circuit 102 to measure the current and phase of the signal to be transmitted through an antenna. An antenna properties calculation circuit 104 is included to determine antenna properties (e.g., antenna impedance, approximation of effective Q factor) and derive an amount of antenna detuning based on the current and phase measurements. In some examples, the optimal current is measured through a process described by FIG. 2. Through the calibration process, the optimal current is obtained when the current stabilizes, as shown in the section 206 of FIG. 2.

A modulator 108 is included to receive the data to be transmitted and encode the data to convert the received data in a signal that is suitable to be transmitted using the antenna. A driver is included to drive the antenna. It may be noted that the antenna may be coupled externally to the integrated circuit that embodies the LF antenna control circuit 100. In some examples, a plurality of drivers may be included. As shown in FIG. 1, Antenna 1, Antenna 2 and Antenna 3 are coupled to three separate antenna drivers.

A controller 106 is included to provide a calculated amount of voltage to the drivers that drive the antennas. An antenna driver is well known to a person skilled in the art. One example of the driver may be found in application Ser. No. 16/026,180 filed on Jul. 3, 2018 entitled "LOW COST LF DRIVER CURRENT SENSE TOPOLOGY" which is being incorporated herein by reference in its entirety. In some embodiments, the antenna properties calculation circuit 104 may be included in the controller 106. In some examples, the controller 106 may be a programmable microcontroller that may include a memory for storing calibration data as described in the description of FIG. 2.

Figure 2:
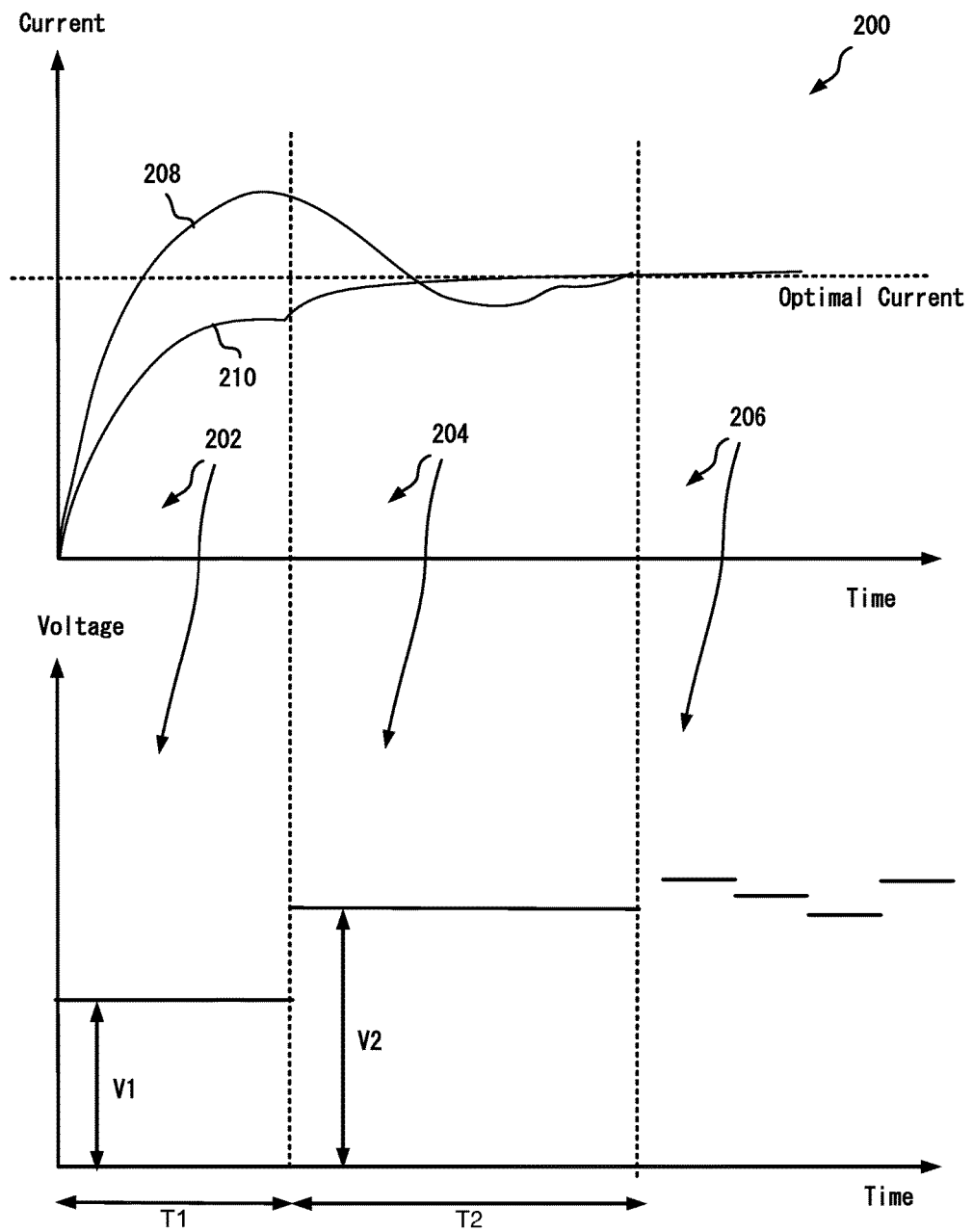
FIG. 2 shows a multistep drive sequence for the LF antenna control circuit in accordance with one or more embodiments of the present disclosure.

FIG. 2 illustrates calibration curves 200 for the LF antenna control circuit 100. In some example, these curves can be derived using a calibration process and the results of the calibration process may be stored in a memory. The controller 106 may then use the stored data to derive an optimal signal amplitude to be applied to the driver at different time intervals when a bit is transmitted through the antenna. In some example, however, the controller 106 may derive the voltages and time intervals as described herein based on characteristics (e.g., impedance, Q factor) and measured current and phase of the antenna.

FIG. 2 includes two graphs. These graphs are an outcome of a calibration process. The top graph shows time on the x-axis and the antenna current envelop on the y-axis. An optimal current value may be obtained through measuring the current when the antenna is optimally tuned to the carrier frequency or through experimenting when the current stabilizes as shown in the section 206. Graph 208 in the section 202 shows the current overshoot in a detuned antenna without the application of the embodiments described here. In terms of time, the section 202 (e.g., the time T1) is less wide than the width of a pulse that represent a bit to be transmitted. If the bit is transmitted without any voltage adjustments, the transmission of the bit may be deformed and a receiver tuned to receive the transmitted signal may not be able to demodulate the bit. In some examples, based on trial and error, a time period T1 and a voltage V1 is determined to keep the antenna current according to the graph 210. As depicted in the section 202, the current during the time period T1 is kept below the final optimal current. In some examples, the voltage V1 may be determined such that the current according to the graph 210 is between 65-96% below the optimal current. Ideally, in the section 202, the goal is to get as close to the optimal current as possible. When the current stops rising, as shown in the section 204, a second voltage V2 and a second time period T2 is determine to bring the current substantially close to the optimal current. As shown in the section 206, the controller 106 is configured to drive the driver subsequent to the time period T2 in a feedback loop according to the output of the current and phase measurement circuit 102. After the time period T2, the amplitude changes are applied in smaller steps according to the continuous current and phase measurements to keep the antenna current substantially close to the optimal current. In some examples, the time period T1 is smaller than the time period T2 and the voltage V1 is small than the voltage V2. However, in depending upon specific antenna properties and the amount of detuning, T1 may be larger than T2 or V1 may be larger than V2.

It should be noted that depending on the amount of current offshoot or undershoot due to the amount of detuning of the antenna, more steps may be incorporated in addition to T1 and T2 before switching to the feedback loop step as shown in the section 206.

Based on the calculated antenna properties based on the current and phase measurements, the controller 106 may calculate the required amplitudes V1, V2 and length T1, T2 of the different amplitude steps. The amplitude V1 is defined by the measured phase. In some examples, with larger antenna phase V1 and T1 become smaller. V2 is define by the impedance of the antenna in combination with the desired antenna target current, for example, the optimal current.

In some embodiments, the antenna properties calculation circuit 104 (or the controller 106) calculates the antenna impedance based on the applied driving voltage at the antenna and resulting antenna current. The resulting impedance may be used to preset V2. The ratio V1/V2, and the duration of the different steps, e.g., T1 and T2 may be calculated based on the measured antenna phase, calculated impedance and known antenna inductance.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A low frequency (LF) antenna control circuit, comprising:
   an antenna driver to drive an antenna;
   a current and phase measurement circuit to measure antenna current and signal phase;
   a modulator to modulate a signal to be transmitted via the antenna, wherein the signal included encoded bits of data to be transmitted; and
   a controller configured to drive the antenna through the antenna driver using a first fixed voltage for a first time period, a second fixed voltage for a second time period that is subsequent to the first time period and subsequent to the second time period drive the antenna driver using step up/down voltages based on the measured antenna current and signal phase.

2. The LF antenna control circuit of claim 1, wherein the controller is configured to start the transmission of every bit in the encoded bits at the beginning of the first time period for every bit to be transmitted through the antenna.

3. The LF antenna control circuit of claim 1, wherein the LF antenna control circuit is incorporated in an integrated circuit.

4. The LF antenna control circuit of claim 3, wherein the integrated circuit includes a pin to couple the antenna to the integrated circuit.

5. The LF antenna control circuit of claim 1, further including a plurality of antenna drivers to drive a plurality of antennas.

6. The LF antenna control circuit of claim 1, wherein the modulator is configured to encode the signal using amplitude modulation and Manchester encoding.

7. The LF antenna control circuit of claim 1, wherein the first fixed voltage, the first time period, the second fixed voltage and the second time period are determined using a calibration process.

8. The LF antenna control circuit of claim 1, wherein the current and phase measurement circuit is configured to measure an antenna current and signal phase continuously during the transmission of the signal, wherein the antenna current and the signal phase are different from the optimal antenna current and the optimal signal phase due to a change in antenna characteristics.

9. The LF antenna control circuit of claim 8, wherein the change in the antenna characteristics includes a change in antenna impedance.

10. The LF antenna control circuit of claim 7, wherein the calibration process includes storing the first fixed voltage, the first time period, the second fixed voltage and the second time period in a memory readable by the controller.

11. The LF antenna control circuit of claim 7, wherein the first voltage is less than the second voltage.

12. The LF antenna control circuit of claim 7, wherein the first time period is shorter than the second time period.

13. The LF antenna control circuit of claim 1, wherein the first fixed voltage, the first time period, the second fixed voltage and the second time period are determined by the controller automatically based on properties of the antenna.

14. The LF antenna control circuit of claim 13, wherein the antenna properties are periodically or continuously determined and first fixed voltage, the first time period, the second fixed voltage and the second time period are continuously adjusted.

15. The LF antenna control circuit of claim 14, wherein the antenna properties include a Q factor and an impedance of the antenna.

16. The LF antenna control circuit of claim 1, wherein the controller is further configured to drive the antenna through the antenna driver using a third fixed voltage for a third time period prior to driving the antenna driver using step up/down voltages based on the current and phase measurement feedback.

* * * * *